(12) United States Patent
Lin et al.

(10) Patent No.: US 7,200,194 B2
(45) Date of Patent: Apr. 3, 2007

(54) RECEIVER SIGNAL DYNAMIC RANGE COMPENSATION BASED ON RECEIVED SIGNAL STRENGTH INDICATOR

(75) Inventors: Jingdong Lin, Irvine, CA (US); Shengquan Hu, San Jose, CA (US); Jin Ji, Sunnyvale, CA (US); Ying Tian, Santa Clara, CA (US); Datong Chen, Fremont, CA (US)

(73) Assignee: Spreadtrum Communications Corporation, Sunnyvale, CA (US)

( * ) Notice: Subject to any disclaimer, the term of this patent is extended or adjusted under 35 U.S.C. 154(b) by 891 days.

(21) Appl. No.: 10/269,932

(22) Filed: Oct. 11, 2002

(65) Prior Publication Data
US 2004/0071231 A1    Apr. 15, 2004

(51) Int. Cl.
*H04B 1/10* (2006.01)
(52) U.S. Cl. .................. 375/350; 375/229; 375/345; 708/300; 708/323; 708/408; 708/620
(58) Field of Classification Search ............... 375/350
See application file for complete search history.

(56) References Cited

U.S. PATENT DOCUMENTS

| 5,260,888 | A | * | 11/1993 | Sharman | 708/308 |
| 5,861,831 | A | * | 1/1999 | Murden et al. | 341/139 |
| 6,480,528 | B1 | * | 11/2002 | Patel et al. | 375/148 |
| 6,480,550 | B1 | * | 11/2002 | Zimmermann | 375/242 |
| 7,012,957 | B2 | * | 3/2006 | Allpress et al. | 375/233 |
| 7,049,996 | B1 | * | 5/2006 | Shen | 341/200 |
| 2003/0152180 | A1 | * | 8/2003 | Schenk | 375/355 |

* cited by examiner

*Primary Examiner*—Chieh M. Fan
*Assistant Examiner*—Ted M. Wang
(74) *Attorney, Agent, or Firm*—Perkins Coie LLP

(57) ABSTRACT

A method for processing a received signal at a mobile receiver of a wireless communications system is disclosed. The method comprises demodulating the received signal to obtain an analog base band signal and converting the analog base band signal into a digital base band signal. The signal strength of the digital base band signal is estimated and, using the estimation, the digital base band signal is scaled by a scaling factor. The digital base band signal is equalized into an equalized digital signal which is then rescaled by a rescaling factor.

19 Claims, 8 Drawing Sheets

RECEIVER SIGNAL DYNAMIC RANGE COMPENSATION BASED ON RECEIVED SIGNAL STRENGTH INDICATOR

TECHNICAL FIELD

The present invention relates to dynamic range compensation in a wireless receiver, and more particularly, to a compensation scheme using received signal strength.

BACKGROUND

In wireless communications systems, the mobile receiver (such as a cell phone) can experience significant variations in the received signal strength of a signal that is transmitted by the base station transmitters. It is not unusual to experience a 70 dB variation from the strongest to the weakest signal strength. The variation is due to various factors, including the varying distance between the mobile receiver and the a base station, Rayleigh fading, and other operational variances.

Thus, the mobile receiver should have a means for compensating for this wide variation in received signal strength. In some mobile receivers, an automatic gain control circuit is used. While these circuits can be useful, they are still unable to fully compensate for the dynamic range in the received signal. For example, in the Global System for Mobile Communications (GSM) standard for digital cellular telephony, interleaving of data is employed. Because of this interleaving, a slow AGC is typically employed that cannot fully compensate for the full range of variation.

If the dynamic range of the received signal is not adequately compensated, this will significantly increase the difficulty in signal processing by the base band digital receiver, or will result in signal degradation due to saturation or truncation error.

DETAILED DESCRIPTION

The present invention describes a method for scaling a received signal having a wide dynamic range. By re-scaling the received signal, the received signal can be processed by the base band digital receiver without signal degradation. In the following description, numerous specific details are provided to provide a thorough understanding of the embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout the specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout the specification are not necessarily all referring to the same embodiment. Furthermore, the particular features, structures, or characteristics may be combined in any suitable manner in one or more embodiments.

Figure 1:
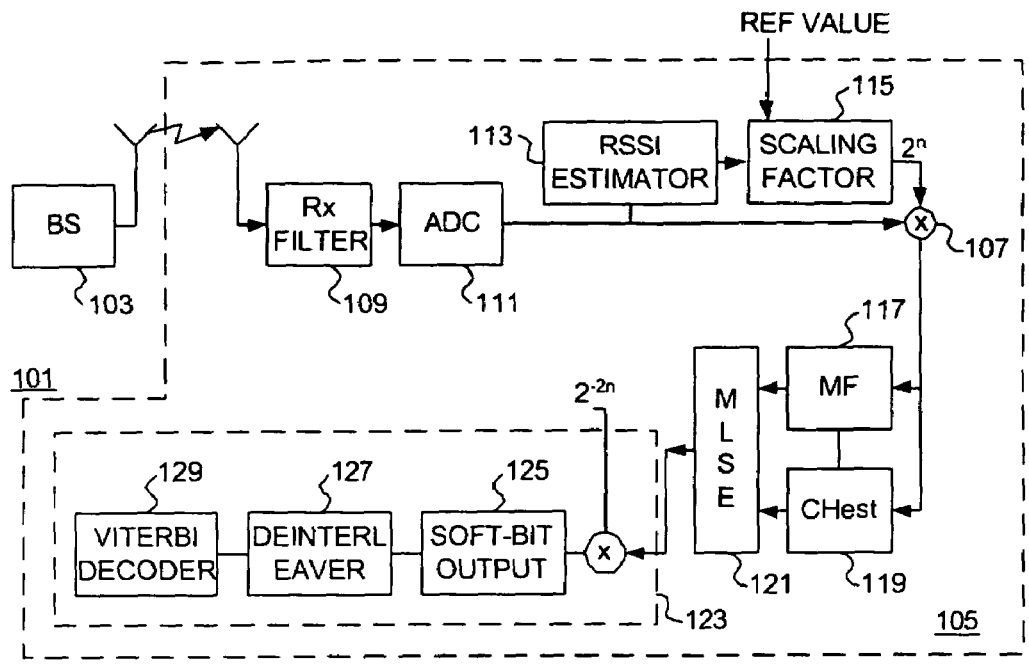
FIG. 1 is a schematic diagram of a circuit for compensating for variations of dynamic range in a received signal in accordance with one embodiment of the present invention.

FIG. 1 shows a portion of a wireless communications system 101 that includes a base station 103 and a mobile receiver 105. A signal transmitted by the base station 103 to the mobile receiver 105 is received and processed using its internal circuitry. Only the germane portions of the mobile receiver 105 are shown. It can be appreciated that the mobile receiver 105 contains many components, such as a keypad, screen, microphone, power source, etc. . . . . For the sake of clarity however, only those portions of the digital signal processing circuitry necessary for a full and complete explanation of the present invention is provided. Indeed, only the "base band" portion of the signal processing circuitry is shown in FIG. 1.

The mobile receiver 105 includes a bit shifter 107, a receive filter 109, an analog-to-digital converter (ADC) 111, a received signal strength estimator 113, a scaler 115, a matched filter 117, a channel estimator 119, a maximum likelihood sequence estimator (MLSE) 121, and a rescaler/Viterbi decoder 123. As will be seen in further detail below, these components are operative to scale a received signal to act as a fast automatic gain control circuit.

In operation, the signal transmitted by the base station 103 is received by the mobile receiver 105. The mobile receiver includes an antenna (not shown) and a RF module (not shown) that performs demodulation of the received analog signal. As can be appreciated by those skilled in the art, the RF module is operative to demodulate the received signal and output I (real) and Q (imaginary) components of the received complex analog signal. The I and Q components are then provided to a "base band" portion for further processing.

For the sake of clarity, the RF module is not shown, but can be appreciated as being conventional in the art. The output of the RF module are the I and Q components of the received analog signal. The I and Q components are provided to receive filter 109 for filtering. After filtration, the I and Q components are provided to ADC 111, which serves to convert the I and Q components from analog format to digital format. In one embodiment, the ADC 111 provides a sixteen bit representation of the I and Q analog signals at a sampling rate of 540,000 samples per second in one embodiment. However, a slower sampling rate of 270,000 samples per second may be used. Thus, the output from the ADC 111 are two series (one for I and one for Q) of 16 bit digital words representing the received analog base band signal. The output of the ADC 111 is also referred to as the base band digital signal.

The output of the ADC 111 is then provided to the RSSI estimator 113 and to bit shifter 107. The RSSI estimator 113 can be of conventional design and provides an indication as to the magnitude of the received signal as embodied by the output of the ADC 111. In one embodiment, the RSSI estimator 113 merely takes the squares of the I and Q components for each sample and adds them together for a magnitude for that sample. To get an average power, the magnitudes for each sample are averaged. In short, the RSSI estimator 113 is any device that can provide an indication of the magnitude of the digital signals output by the ADC 111, and thus, the received signal strength.

The scaler 115 receives the output of the RSSI estimator and based upon this information, provides a scaling value "n" that is indicative as to how much to scale the 16 bit digital word from the ADC 111. The scaler 115 can be implemented in one embodiment as a look up table that correlates the estimation signal from the RSSI estimator 113 to an appropriate scaling value "n". In one embodiment, the scaling value "n" is calculated for each "burst" of received data. For example, in a time division multiple access system, each burst can correspond to a specific time slot in successive frames.

In another embodiment, the scaler 115 also incorporates the use of a reference value (either as an input or prestored in memory). The reference value may be thought of as the nominal signal strength. Thus, if the RSSI estimator 113 provides an indication that is above the reference value, then the signal from the ADC 111 should be scaled down by providing, in one embodiment, a negative value for "n". Conversely, if the RSSI estimator 113 provides an indication that is below the reference value, then the signal from the ADC 111 should be scaled up by providing a positive value for "n". Further, the amount by which the RSSI estimator 113 output is above or below the reference value can be used to determining the specific magnitude of the scaling value "n".

In one embodiment, the scaling value n for a scaling factor $2^n$ is determined by: $(1/2)*\log_2(P_{est}/P_{ref})$, where $P_{est}$ is the estimated average signal power provided by the RSSI estimator 113 and $P_{ref}$ is the reference power level. As seen in further detail below, the operation of the scaling method of one embodiment of the present invention is as follows:

When the received signal is weak, or $P_{est}$ is less than $P_{ref}$, the received signal is scaled up by factor of $2^n$. This is equivalent to having the bit shifter 107 shift the 16 bit words to the left by n bits.

When the received signal is strong, or $P_{est}$ is larger than $P_{ref}$, the received signal is scaled down by factor of $2^n$. This is equivalent to having the bit shifter 107 shift the 16 bit words to the right by n bits.

Thus, the value "n" is provided to the bit shifter 107 and relates to the number of bits that the bit shifter 107 is to shift the 16 bit digital words from the ADC 111. The bit shifter 107 is operative to shift the 16 bit words either towards the left (corresponding to adding bits on the least significant bit side) or the right (corresponding to adding bits on the most significant bit side). In one embodiment, if a positive value for "n" is received, then the bit shifter 107 should shift the 16 bit words towards the left by the value "n". If a negative value for "n" is received, then the bit shifter 107 should shift the 16 bit words towards the right by the value "n".

As an example, assuming that the 16 bit word input to the bit shifter 107 is "0001110001111110", then if the word is shifted three bits to the left, the resulting word would be "1110001111110000". Similarly, if the word is shifted three bits to the right, the resulting word would be "0000001110001111". The effect of shifting the word three bits to the left is to multiply the decimal value of the word by $2^n$, where n is the number of bits shifted. The effect of shifting the word three bits to the right is to multiply the decimal value of the word by $2^{-n}$, where n is the number of bits shifted. Note that there is some minor rounding error for small values.

This type of scaling using the integer scaling value "n" and a bit shifter is an efficient means of implementing a multiplication or a division function in the digital domain. Alternatively, the scaling factor may be an analog decimal factor that is used to multiple or divide the analog version of the output of ADC 111. However, this approach would require further circuitry to effectuate the scaling. In short, the present invention teaches the scaling of the received signal (in the analog or digital domain) based upon the received signal strength and is not limited to the specific digital implementation shown in FIG. 1 or 2.

Once the bit shifter 107 has performed the requisite shifting, the shifted 16 bit words are provided to the matched filter 117 and the channel estimator 119. The matched filter 117 and channel estimator 119 are well known in the art and are operative, in conjunction with the MLSE 121, to perform equalization of the base band digital signal. The combination of the matched filter 117, the channel estimator 119, and the MLSE 121 is also referred to as an equalizer.

As seen in FIG. 1, the output of the MLSE 121 (referred to as an equalized digital signal) is then provided to rescaler/Viterbi decoder 123. In one embodiment, the MLSE 121 outputs an equalized digital signal that comprises a sign bit and a plurality of soft bits. Those of ordinary skill in the art will understand that the sign bit is indicative of whether the digital data is a "one" or a "zero". Further, as is known in the art, the soft bits are an indication as to the quality of the estimation.

In order to avoid the performance loss due to the signal scaling, prior to input into a Viterbi channel decoder 129, the equalized digital signal output by the MLSE 121 is scaled back by $2^{2n}$. This is referred to as rescaling. Note that in this embodiment, the rescaling is performed using a resealing valude of "2n", i.e., twice that of the original scaling value "n". This is because in many prior art channel estimators, including the particular one used in FIG. 1, the channel estimator 119 will square the scaled digital base band signal. Thus, in order to reverse the scaling by the bit shifter 107 and the squaring by the channel estimator, the resealing should be done with a factor of $2^{-2n}$.

The resealing can take one of two forms, referred to as the Shift-Take method (ST) and Take-Shift method (TS).

Shift-Take (ST) Method:

This method is shown in FIG. 1. The concept is that the output of MLSE 121, referred to as $\Delta$, is first shifted back by 2n bits. This can be expressed as $\Delta'=\Delta/2^{2n}$, where $\Delta'$ is the re-shifted version of $\Delta$. After the shifting, the k soft bits are taken from $\Delta'$ starting from a position $N_{opt}$, where $N_{opt}$ is the optimal position to start taking the k soft bits. This is equivalent to taking k bits from $\Delta$ starting from the position of $N=N_{opt}-2n$. The parameter "k" is predetermined and is the number of soft bits used by the Viterbi decoder. The k soft bits are then input into the deinterleaver 127. The deinterleaver 127 is operative as in the prior art and serves to reconstruct the transmitted data. In many wireless communications systems, the data to be transmitted is first interleaved at the transmitter by an interleaver. Thus, a deinterleaver is used to reconstruct the data. The deinterleaver 127 in the GSM protocol is a standard circuit/device dictated by the protocol. The data stream from the deinterleaver 127 is then input into the Viterbi decoder 129. The Viterbi decoder 129 is of conventional design.

Figure 2:
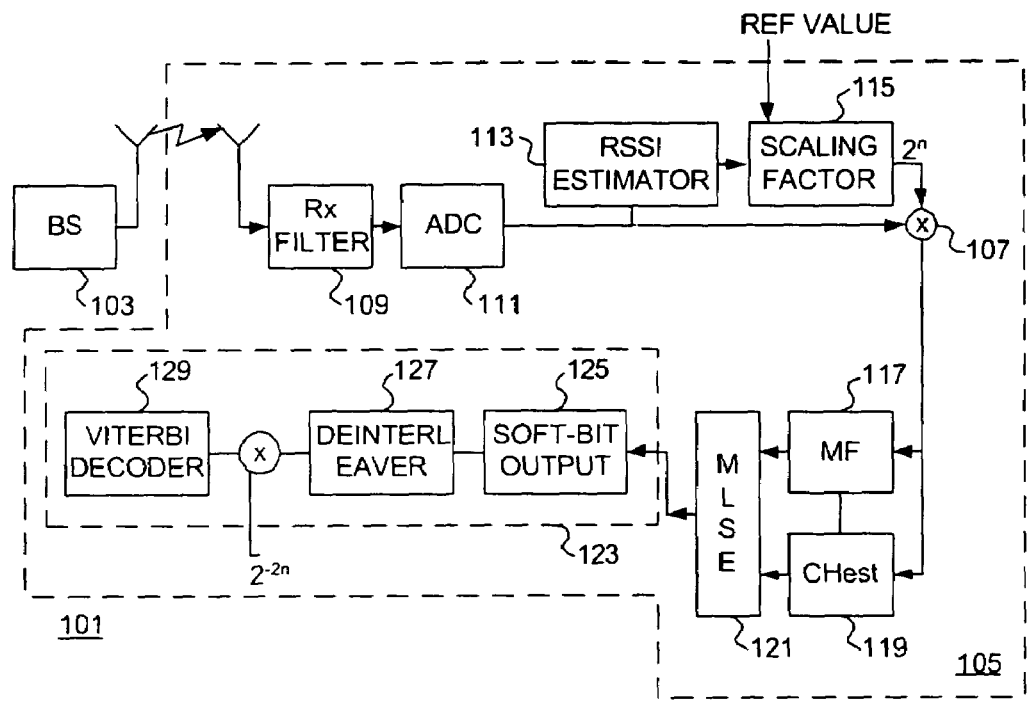
FIG. 2 is a schematic diagram of a circuit for compensating for variations of dynamic range in a received signal in accordance with an alternative embodiment of the present invention.
Figure 3:
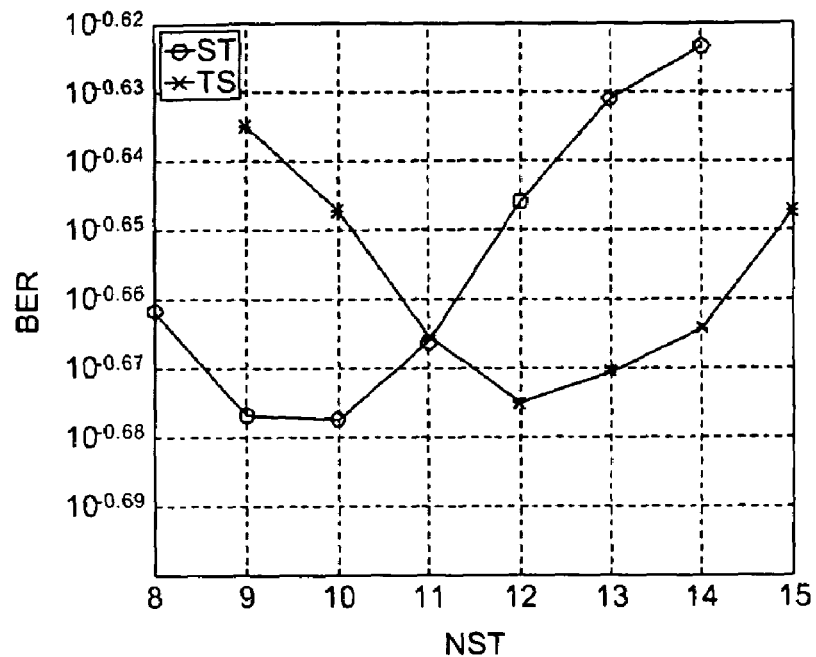
FIGS. 3–15 are diagrams illustrating experimental simulation results using the methods and apparatus of the present invention.
Figure 4:
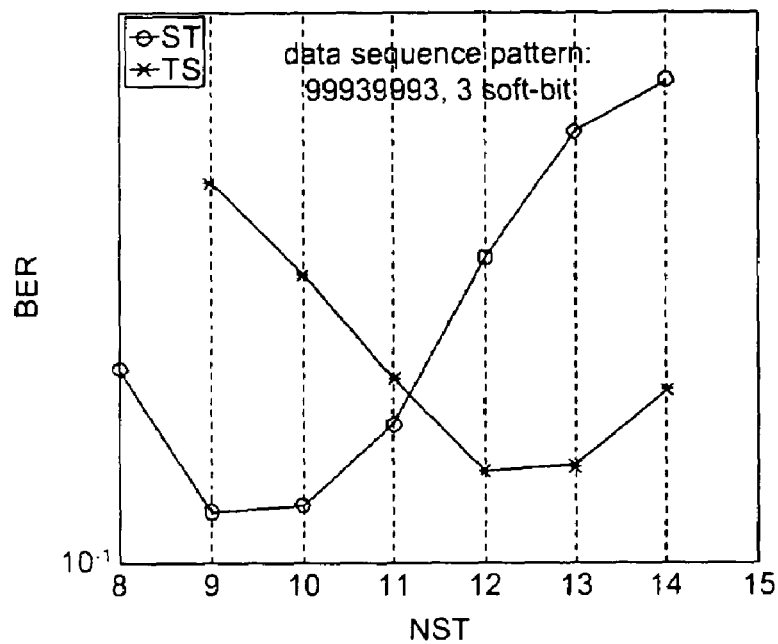
Figure 5:
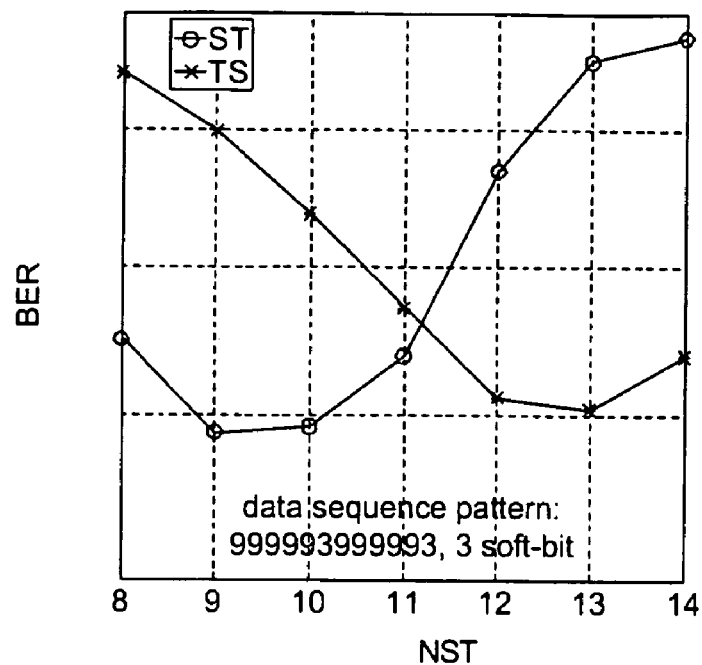
Figure 6:
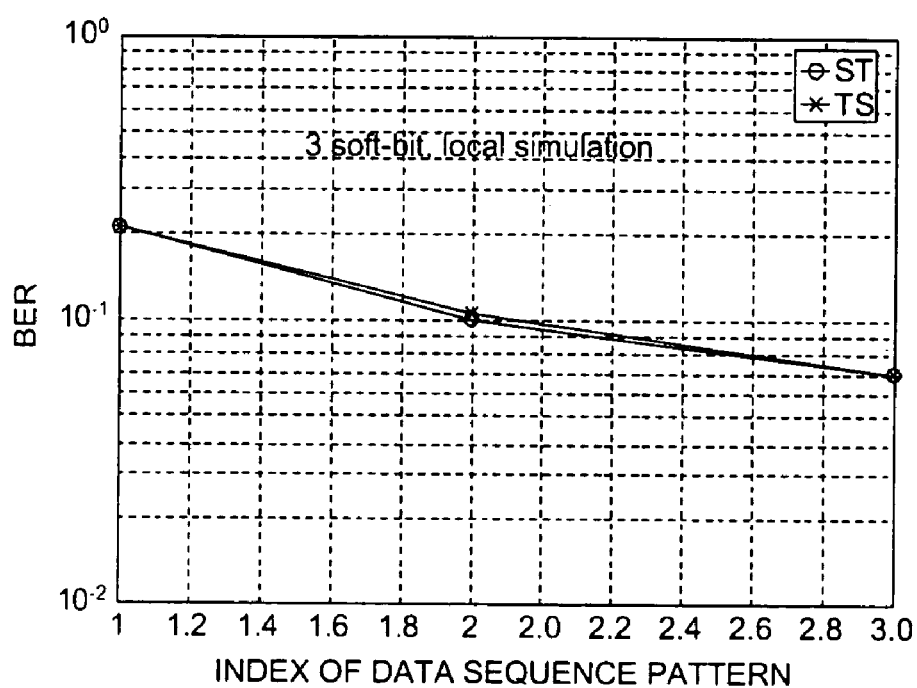

Take-Shift (TS) Method:

This method is shown in FIG. 2. Note that FIG. 2 is substantially identical to FIG. 1 except for the configuration of the rescaling/Viterbi decoder 123. In this embodiment, the k soft bits are first taken out from the output $\Delta$ of the MLSE 121 starting from the position of $N_{opt}$. After deinterleaving, the k soft bits are then shifted by 2n bits and the result is provided to the Viterbi decoder 129.

Results

The two rescaling methods ST and TS were compared using simulation techniques. For a given SNR, the number of scaling bits n is almost constant (e.g., for SNR=3 dB, n=1, and for SNR=9 dB, n=2). For example, we combined the 3 dB and 9 dB bursts as pattern of '939393'. FIGS. 3~6 shows the BER performance for the different burst pattern. Note that in this simulation, the simulation is only run on the segment of the channel condition of interest, referred to as "local simulation" Here, we fixed number of soft bits as 3. Simulation results indicate that the rescaling method ST achieved almost the same performance as TS.

Similar simulations were performed where the simulation goes through a time-variant fading channel. This is referred to as a global simulations, the results of which are shown in FIGS. 7~15. Three types of channel testing models where considered: HT100, TU50 and RA130. All the simulations were performed under the assumptions of a GSM1800 system, ½ convolutional coding, and an eight burst interleaver (this is equivalent to the FACCH logical channel structure).

(1) HT100

Figure 7:
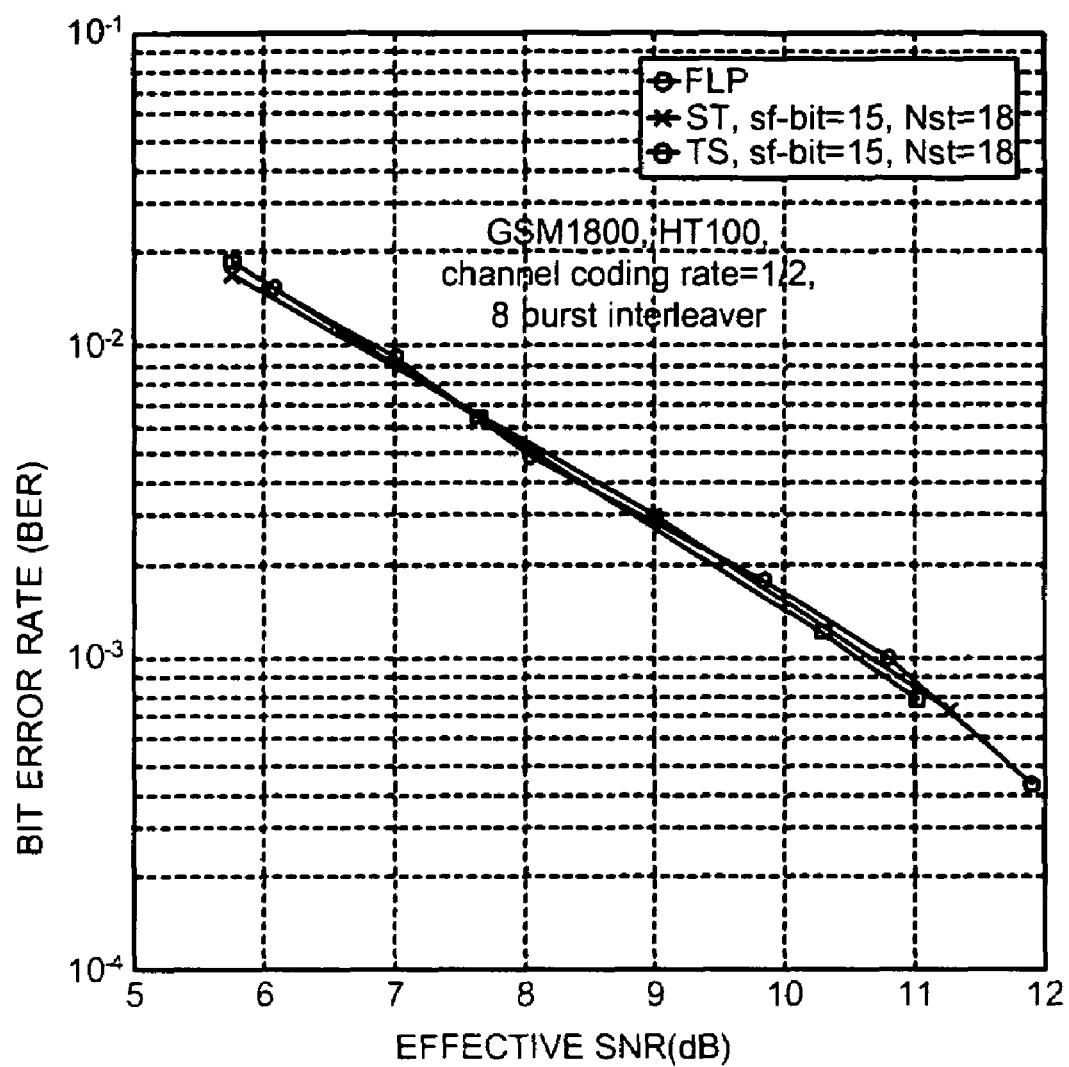
Figure 8:
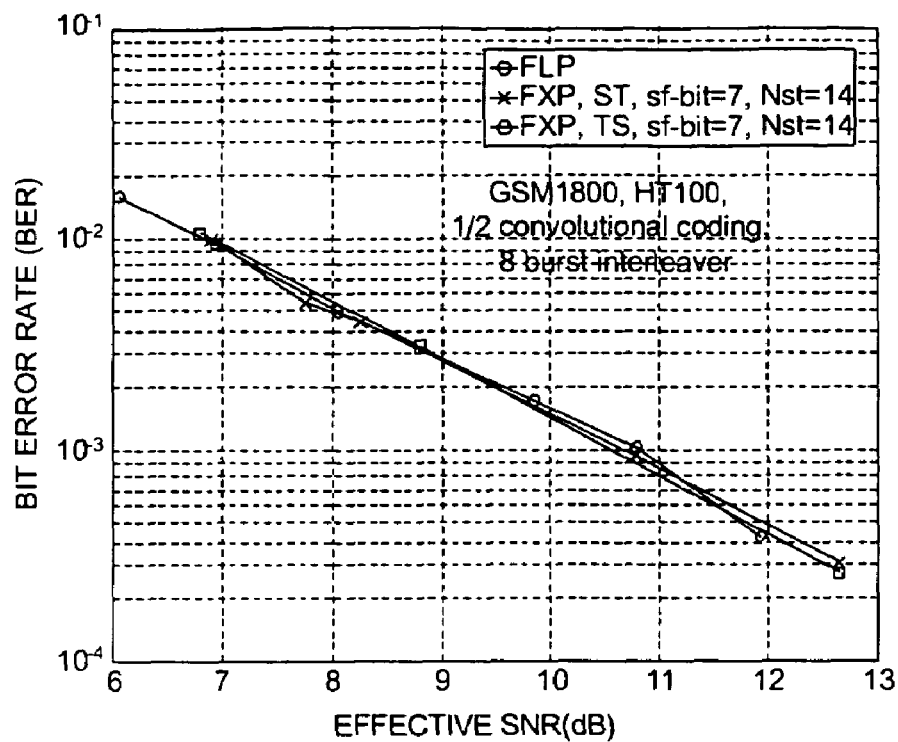
Figure 9:
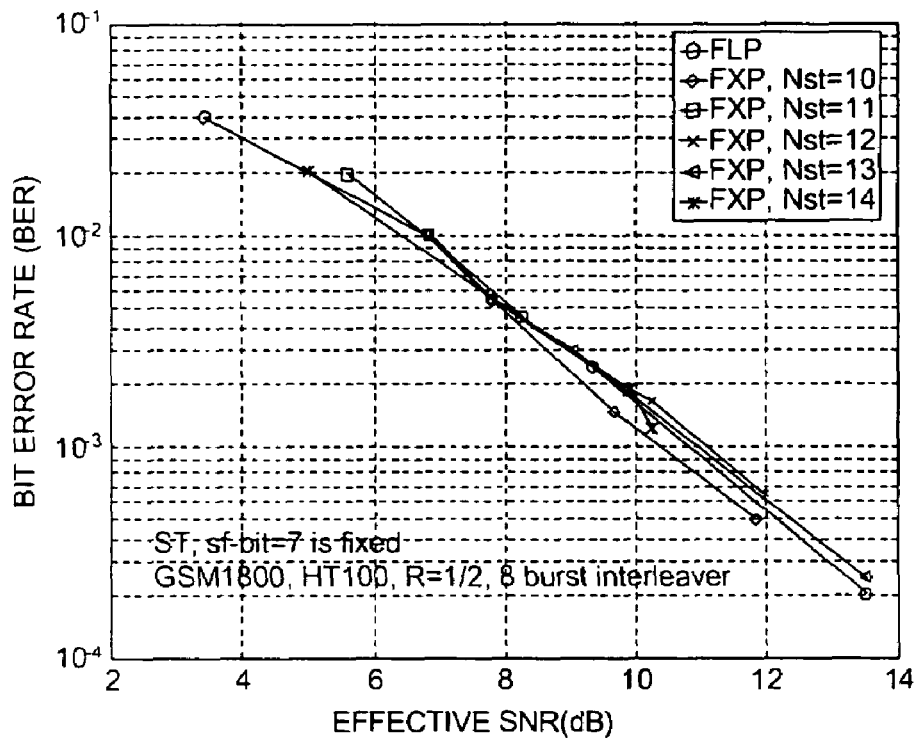
Figure 10:
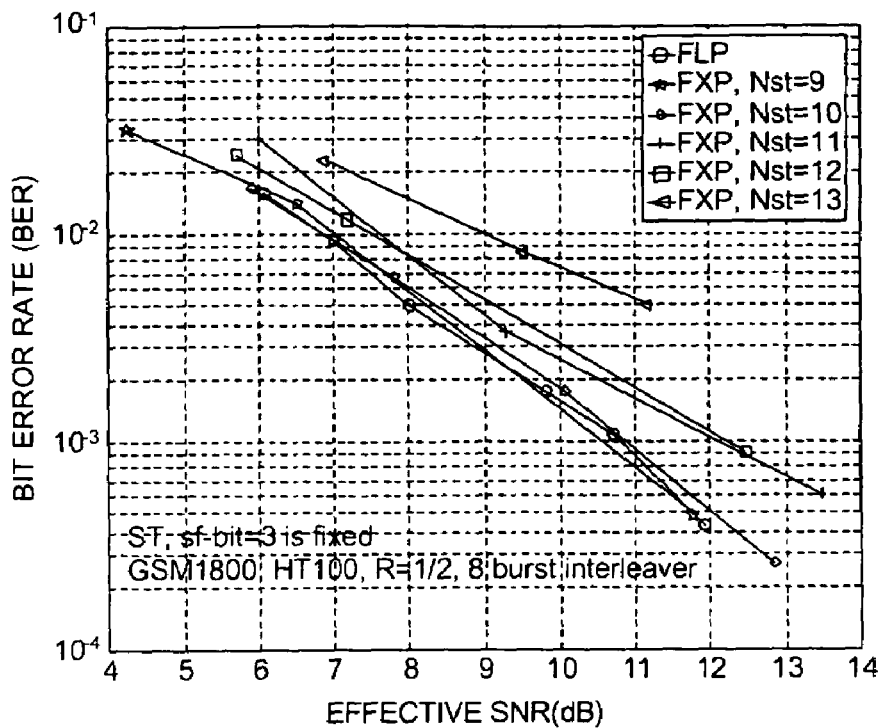
Figure 11:
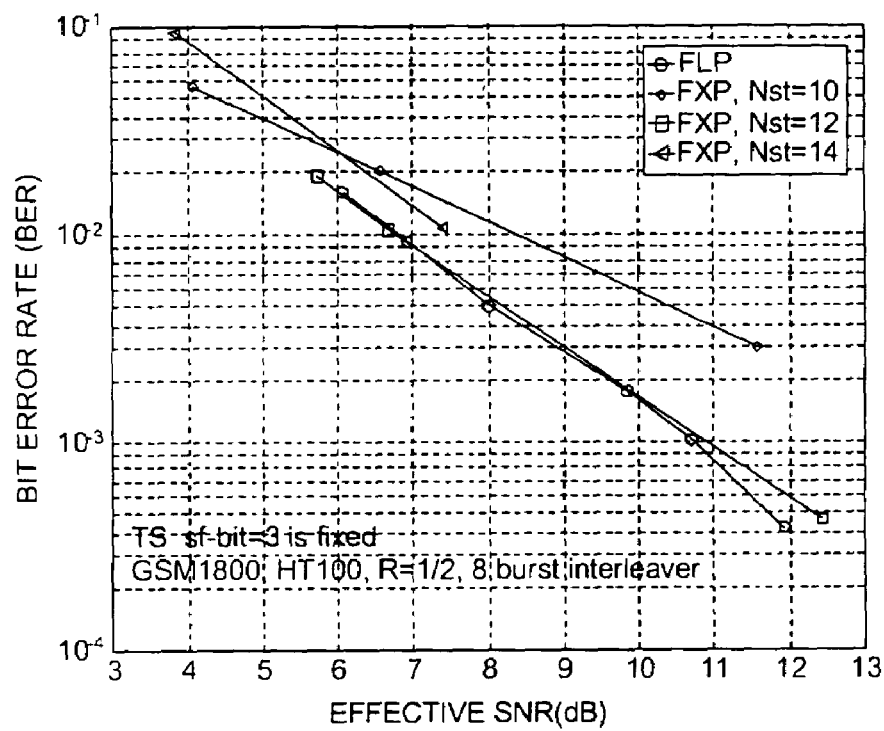

First examined was the BER performance of ST and TS schemes with 15 soft bits. The results in FIG. 7 show that both ST and TS methods approach the BER performance of a floating point system. Also compared was the BER performance of a floating-point system with fixed point system using 7 soft bits for both ST and TS methods. The results are illustrated in FIG. 8. Again, the performance loss of the fixed point system compared with the floating point system is negligible. The BER performance of the ST scheme with 7 soft bits for different $N_{st}$ is shown in FIG. 9. We found that the performance is not sensitive to the $N_{st}$ when a large number of soft bits are used in later Viterbi decoding.

Figure 12:
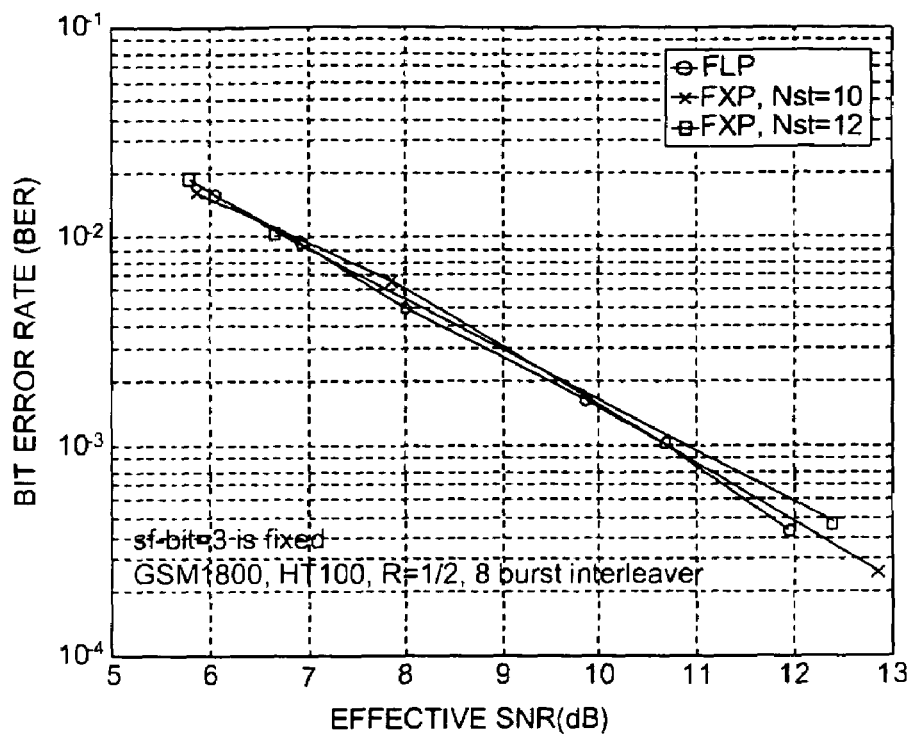

For the three soft bits case, the BER performance of ST and TS schemes was examined for different values of $N_{st}$. From the simulation results shown in FIGS. 10 and 11, it was found that $N_{opt}$ for ST is equal to 9 or 10, and $N_{opt}$ is equal to 12 for TS. The performance comparison of ST and TS with $N_{opt}$ is shown in FIG. 12. We observed that both schemes using 3 soft bits can still achieve good enough performance, and the degradation comparing with the floating point system is less than 0.5 dB.

(2) TU50

Figure 13:
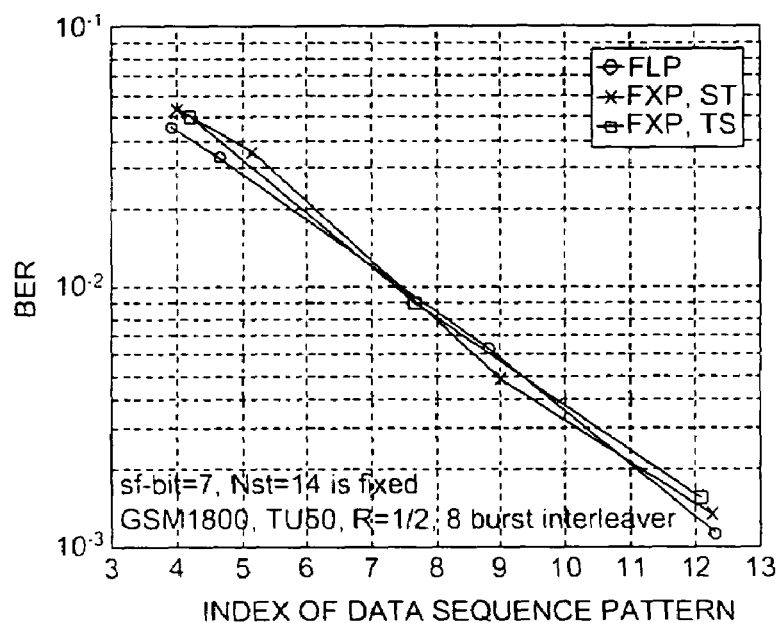
Figure 14:
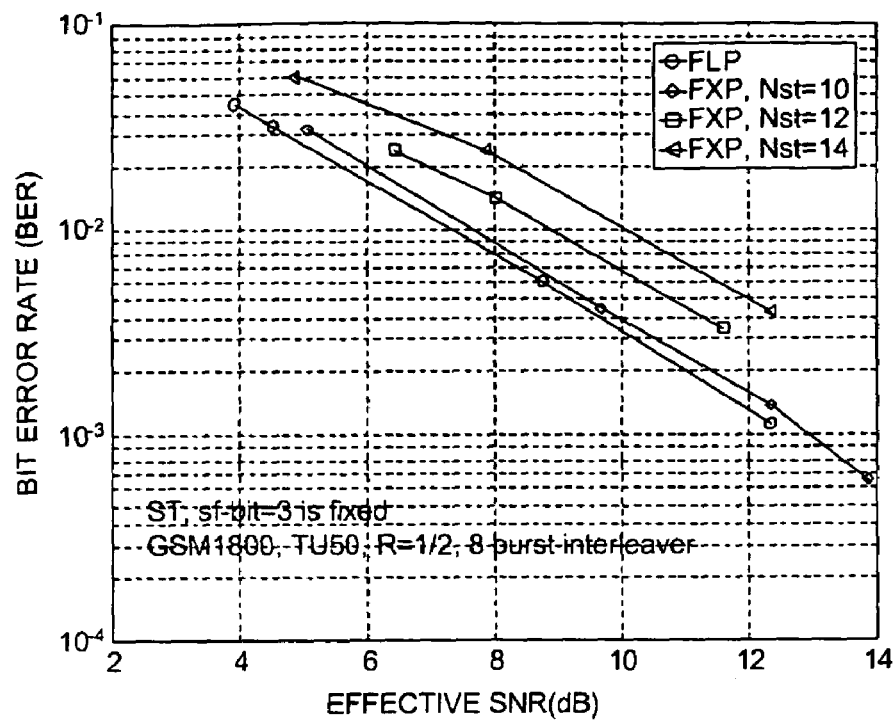

For this case, the performance of ST and TS schemes were compared with 7 soft bits. Here we use $N_{st}$=14. The simulation results are shown in FIG. 13. Also considered was the ST scheme with 3 soft bits for $N_{st}$=10, 12, 14 in FIG. 14. Again, it was found that the performance loss of the ST scheme with 3 soft bits is also less than 0.5 dB.

(3) RA130

Figure 15:
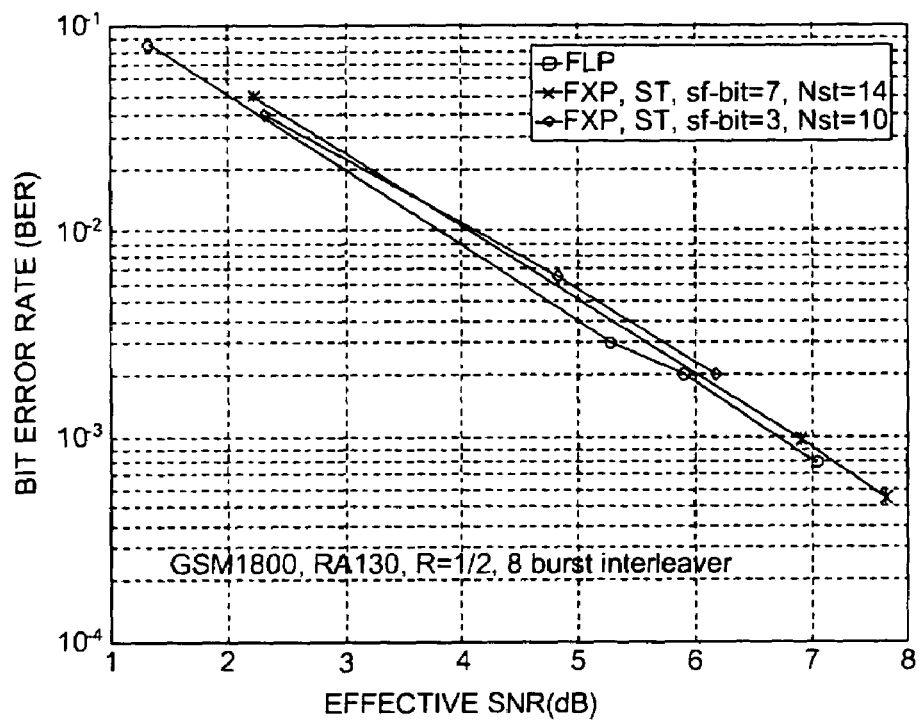

Finally, the BER performance of ST with 7- and 3 soft bits for RA130 is shown in FIG. 15. The same performance results as HT100 and TU50 cases are observed in this case, i.e. MLSE with 3 soft bits, results in less than 0.5 dB performance degradation.

From above investigation results, it is concluded that:
Rescaling methods ST and TS achieve almost the same BER performance. However, from the implementation point of view, ST requires a smaller register size in the Viterbi decoder than TS method.
Both ST and TS with 3 soft bits (plus 1 hard bit) can achieve acceptable BER performance. The performance loss of a Viterbi decoder with 3 soft bits compared with floating point model is less than 0.5 dB.
The optimal soft bit output position $N_{opt}$ from MLSE equalizer depends on the noise level which can be characterized by the power spectral density ($N_o$) of white Gaussian noise. It was observed that the values of $N_{opt}$ for SNR level ranging from 3 to 10 dB can be approximated as the same, and $N_{opt}$ for SNR beyond 12 dB is just 1 or 2 bits shifted toward to LSB.
The selection of parameter $N_{opt}$ also depends on the number of soft bits used in the Viterbi decoder. In general, the more soft bits used, the larger $N_{opt}$ is preferred (i.e. $N_{opt}$ is moved toward MSB), and the less sensitivity of system performance to the $N_{opt}$ selection.

While a specific embodiment of the present invention has been described above, it can be appreciated by those of ordinary skill in the art that other modifications can be made while maintaining the spirit and scope of the invention. From the foregoing, it will be appreciated that specific embodiments of the invention have been described herein for purposes of illustration, but that various modifications may be made without deviating from the spirit and scope of the invention. Accordingly, the invention is not limited except as by the appended claims.

The invention claimed is:

1. A method for processing a received signal at a mobile receiver of a wireless communications system comprising:
    demodulating the received signal to obtain an analog base band signal;
    converting the analog base band signal into a digital base band signal;
    estimating a signal strength of said digital base band signal;
    using a scaling factor to scale said digital base band signal, said scaling factor dependent upon said signal strength;
    equalizing said digital base band signal into an equalized digital signal; and
    rescaling said equalized digital signal by a rescaling factor, wherein said rescaling factor is twice that of the scaling factor.

2. The method of claim 1 wherein said equalizing is performed by a matched filter, a channel estimator, and a maximum likelihood sequence estimator.

3. The method of claim 1 further including:
    deinterleaving said rescaled equalized digital signal; and
    decoding said deinterleaved rescaled equalized digital signal using a Viterbi decoder.

4. The method of claim 1 wherein said scaling is performed by bit shifting said digital base band signal in accordance to said scaling factor.

5. A method for processing a received signal at a mobile receiver of a wireless communications system comprising:
    demodulating the received signal to obtain an analog base band signal;
    converting the analog base band signal into a digital base band signal;
    estimating a signal strength of said digital base band signal;
    using a scaling factor to scale said digital base band signal, said scaling factor dependent upon said signal strength;
    equalizing said digital base band signal into an equalized digital signal; and
    rescaling said equalized digital signal by a rescaling factor, said rescaling factor dependent upon the scaling factor;
    if said signal strength is higher than a reference value, then bit shifting said digital base band signal to the right by said scaling factor; and if said signal strength is lower than the reference value, then bit shifting said digital base band signal to the left by said scaling factor.

6. A method for processing a received signal at a mobile receiver of a wireless communications system comprising:
   demodulating the received signal to obtain an analog base band signal;
   converting the analog base band signal into a digital base band signal;
   estimating a signal strength of said digital base band signal;
   using a scaling factor to scale said digital base band signal, said scaling factor dependent upon said signal strength;
   equalizing said digital base band signal into an equalized digital signal;
   deinterleaving said equalized digital signal into a deinterleaved digital signal; and
   rescaling said deinterleaved digital signal by a rescaling factor, said rescaling factor dependent upon said scaling factor.

7. The method of claim 6 wherein said rescaling factor is twice that of the scaling factor.

8. The method of claim 6 wherein said equalizing is performed by a matched filter, a channel estimator, and a maximum likelihood sequence estimator.

9. The method of claim 6 further including decoding said rescaled deinterleaved digital signal using a Viterbi decoder.

10. The method of claim 6 wherein said scaling is performed by bit shifting said digital base band signal in accordance to said scaling factor.

11. The method of claim 10 wherein:
   if said signal strength is higher than a reference value, then bit shifting said digital base band signal to the right by said scaling factor; and
   if said signal strength is lower than the reference value, then bit shifting said digital base band signal to the left by said scaling factor.

12. An apparatus for processing a received signal at a mobile receiver of a wireless communications system comprising:
   an analog to digital converter that converts an analog base band signal into a digital base band signal;
   a signal strength estimator for estimating a signal strength of said digital base band signal;
   a scaler that scales said digital base band signal using a scaling factor, said scaling factor dependent upon said signal strength;
   an equalizer for equalizing said digital base band signal into an equalized digital signal; and
   a rescaler for rescaling said equalized digital signal by a rescaling factor, said rescaling factor being twice said scaling factor.

13. The apparatus of claim 12 wherein said equalizer further comprises a matched filter, a channel estimator, and a maximum likelihood sequence estimator.

14. The apparatus of claim 13 further including:
   a deinterleaver that deinterleaves said rescaled equalized digital signal; and
   a Viterbi decoder for decoding said deinterleaved rescaled equalized digital signal.

15. The apparatus of claim 12 wherein said scaler includes a bit shifter for bit shifting said digital base band signal in accordance to said scaling factor.

16. An apparatus for processing a received signal at a mobile receiver of a wireless communications system comprising:
   an analog to digital converter that converts an analog base band signal into a digital base band signal;
   a signal strength estimator for estimating a signal strength of said digital base band signal;
   a scaler that scales said digital base band signal using a scaling factor, said scaling factor dependent upon said signal strength;
   an equalizer for equalizing said digital base band signal into an equalized digital signal;
   a deinterleaver for deinterleaving said equalized digital signal; and
   a rescaler for rescaling said deinterleaved equalized digital signal by a rescaling factor, said rescaling factor dependent upon said scaling factor.

17. The apparatus of claim 16 wherein said equalizer further comprises a matched filter, a channel estimator, and a maximum likelihood sequence estimator.

18. The apparatus of claim 16 further including a Viterbi decoder for decoding said deinterleaved rescaled equalized digital signal.

19. The apparatus of claim 16 wherein said scaler includes a bit shifter for bit shifting said digital base band signal in accordance to said scaling factor.

* * * * *